April 21, 1931.  G. C. LEWIS  1,801,436
MANUFACTURE OF LAMP BLACK
Filed April 9, 1927
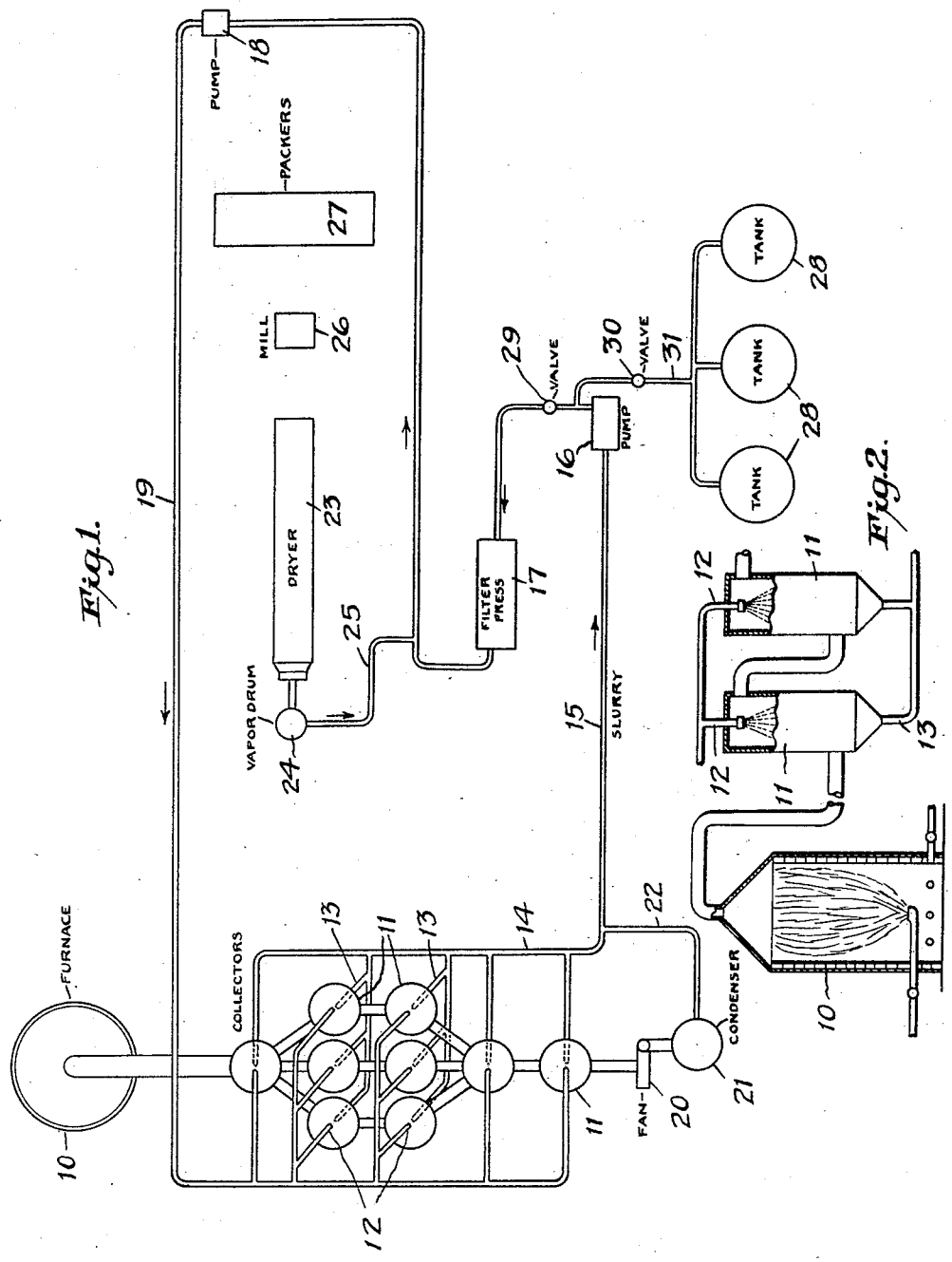
INVENTOR
George C Lewis
BY
Dean Fairbank Albright & Hirsch
ATTORNEY Patented Apr. 21, 1931

1,801,436

UNITED STATES PATENT OFFICE

GEORGE CHARLES LEWIS, OF NEW DORP, NEW YORK, ASSIGNOR TO COLUMBIAN CARBON COMPANY, OF NEW YORK, N. Y., A CORPORATION OF DELAWARE

MANUFACTURE OF LAMPBLACK

Application filed April 9, 1927. Serial No. 182,226.

This invention relates to the manufacture of black by the incomplete combustion of hydrocarbons and relates more particularly to the collection of the black from the fumes or gases of combustion. Such fumes or gases of combustion carrying the fine particles of black in suspension may be produced in various different ways, but preferably by the incomplete combustion of natural gas in an open cylindrical furnace designed for that purpose. Various different processes have been tried for the collection of the black from such fumes, but all such processes with which I am familiar are objectionable in one way or another.

In the complete combustion of methane, which forms the main constituent of natural gas, there are but two products namely carbon dioxide and water vapor. In practice, the combustion is so controlled that the minimum amount of the carbon is burned to carbon monoxide or carbon dioxide and the maximum amount of the hydrogen is burned to water. The ideal reaction is as follows:

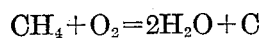

$$CH_4 + O_2 = 2H_2O + C$$

According to the above equation, one molecule of methane produces two molecules of water vapor and one atom of carbon. The main object of my invention is to utilize one of the products of this reaction for the collecting of the other product.

In carrying out my invention, I condense the water vapor and use the water for wetting down and collecting the carbon to form a slurry from which the water is removed and continued in cyclic flow in the system. This water supplied by the gases of combustion is free from mineral or other impurities and thus the collected carbon is in a pure state except for such solid hydrocarbons as may have been formed in the burning of the natural gas.

In carrying out my invention, I may employ the apparatus diagrammatically illustrated in the accompanying drawings:

In these drawings:

Fig. 1 is a plan view of such an apparatus, and

Fig. 2 is a vertical section through the furnace and two of the collectors.

In the apparatus illustrated, there is employed a furnace 10 which is preferably a cylindrical chamber free of checker work or other internal obstructions and in which the natural gas is burned to incomplete combustion in such a way as to produce the maximum of free carbon and of water vapor. The fumes, which may also include carbon dioxide, carbon monoxide and other gases, pass to a collector 11 which may be a simple cylindrical vessel. Preferably there are a plurality of these collector vessels and the fumes enter each near the bottom and pass out near the top. As illustrated, the vessels are arranged both in parallel and in series. Each collector vessel has a spray nozzle 12 at the free end for delivering a water spray downwardly against the upflowing gases. The amount of water delivered is such as will wash out all of the free carbon from the gases. Each vessel has an outlet 13 at the bottom for the slurry formed of water and the carbon. The pipes 13 from the several collector chambers 11 may unite in a manifold 14 and the latter may deliver to a pipe 15 leading to a pump 16. The pump delivers to a filter press 17 in which the water and carbon are separated. The water from the filter press is conveyed by a pump 18 through a conduit 19 to the several spray nozzles of the collecting chambers 11.

In starting the process the water from an outside source is provided in such quantity as will effect the complete deposition of the carbon in the separation chambers and form a slurry. This water reduces the temperature in the separation chambers to such a point that the water vapor in the fumes coming from the furnace is condensed. The quantity of water is thus very materially increased.

After the process has been started it is not necessary to supply any outside water as the process itself produces sufficient water to more than make up for any loss due to leakage or other causes. The process may even produce a surplus of water for use for other purposes.

To secure a substantially complete collection of the water produced in the process, the uncondensed gases of the fumes may be drawn from the top of final collection chamber 11 by a fan 20 and delivered to a condenser 21 where additional water vapor will be condensed and the gases discharged to the atmosphere. This water may be delivered through the pipe 22 to the slurry line 15. The filter cakes from the filter press 17 are delivered to a drier 23 and the vapors from this may be collected and condensed in a drum 24 and the resulting water delivered through the pipe 25 to the return water line 19. The dried carbon may go from the drier to a mill 26 and thence to the packers 27.

To permit the intermittent emptying of the filter press, there is preferably provided one or more storage tanks 28 for the slurry. By closing a valve 29 between the pump and the filter press and opening a valve 30 in a pipe 31 leading from the pump to the storage tanks, the slurry may be delivered to the tanks. When the filter press is ready to be again started in operation, the valves 29 and 30 may be opened so that slurry may be delivered directly from the tanks to the filter press.

The invention is of special utility where natural gas is plentiful and pure water scarce.

Having thus described my invention, what I claim as new and desire to secure by Letters Patent is:

1. The process which includes burning natural gas to produce fumes including gases, water vapor and carbon particles, spraying water into the fumes to wash out all of the free carbon from the gases, condense the water vapor and form a slurry including the carbon particles, separating the water from the carbon particles of said slurry, and returning the water for the spraying of further fumes.

2. The process of making carbon black which includes burning natural gas to produce fumes including carbon particles and gases of combustion, delivering the same to a cooling chamber, spraying into said chamber an amount of water sufficient to wash all of the particles from said gases and to form a slurry of the water and carbon particles, removing the slurry, separating the water from the slurry, and returning said water to said cooling chamber for the spraying of further fumes.

3. The process of making carbon black which includes burning natural gas to produce fumes including carbon particles, gases and water vapor, spraying water into said fumes to condense said water vapors, to separate the free carbon from the gases, and to form a slurry, removing the slurry from the cooling chamber, separating the water and carbon particles of said slurry, and returning said water to said cooling chamber.

4. The process of making carbon black which includes burning natural gas to produce fumes including water vapor, carbon particles and gases, delivering said fumes upwardly through a cooling chamber, maintaining a cyclic circulation of water including spraying water downwardly through said chamber in countercurrent to the ascending fumes to condense the water vapors, wash the carbon particles from the gases, and form a slurry, removing the slurry from said chamber, separating the water from the carbon particles of the slurry, and returning the water to said cooling chamber.

Signed at New York, in the county of New York and State of New York, this 2nd day of April, A. D. 1927.

GEORGE CHARLES LEWIS.